United States Patent [19]

Ehrlich

[11] Patent Number: 4,779,886

[45] Date of Patent: Oct. 25, 1988

[54] STABILIZING WHEEL ASSEMBLY FOR BICYCLES

[75] Inventor: William Ehrlich, Bethlehem, Pa.

[73] Assignee: Bicycle Corporation of America, Bethlehem, Pa.

[21] Appl. No.: 141,375

[22] Filed: Jan. 7, 1988

[51] Int. Cl.⁴ .............................................. B62H 1/00
[52] U.S. Cl. .................................... 280/293; 280/303
[58] Field of Search ............... 280/293, 295, 298, 300, 280/301, 303

[56] References Cited

U.S. PATENT DOCUMENTS 2,647,764  8/1953  Anderson ........................... 280/293

FOREIGN PATENT DOCUMENTS 782362  9/1957  United Kingdom .

Primary Examiner—John J. Love
Assistant Examiner—Donn McGiehan
Attorney, Agent, or Firm—Spencer & Frank

[57] ABSTRACT

A stabilizing wheel assembly has a support frame construction releasably securable to a bicycle and a stabilizing wheel secured to the support frame construction. The latter includes a substantially planar main plate attachable to the bicycle seat stay and the chain stay; a support bar affixed at one of its ends to the main plate and extending generally perpendicularly therefrom; and a fork unit having fork blades straddling the stabilizing wheel and being held on the support bar for a swinging motion in a plane parellel to the main plate. There is further provided an abutting mechansim carried by the support bar and arranged in a path of the swinging motion of one of the fork blades. The abutting mechanism has a rigid abutment member arranged to abut one fork blade on one side, a reilient abutment member arranged to abut that fork blade on the side and adjusting arrangements for displacing the rigid and resilient abutment members, respectively, to set a determined angular position of the fork unit whereby a desired height position of the stabilizing wheel is established.

4 Claims, 2 Drawing Sheets

STABILIZING WHEEL ASSEMBLY FOR BICYCLES

BACKGROUND OF THE INVENTION

This invention relates to a stabilizing wheel assembly which may be readily installed on, or removed from bicycles and is generally utilized for training purposes. The stabilizing wheel assembly with which the invention is concerned is particularly adapted for use in adult bicycles having wheel diameters of between 20 and 28 inches.

Stabilizing (training) wheel assemblies for bicycles are known in a great number of varieties.

Known assemblies comprise a wheel-supporting tube of sheet metal or cast member which carry the stabilizing wheel and which is mounted directly or indirectly on the axle of the rear wheel, the chain stay, the seat stay and/or the seat tube. It is further known to so attach the support member that it is resiliently pivotal in a vertical plane oriented parallel to the direction of travel. It is further known to provide an adjusting mechanism by means of which the distance of the stabilizing wheel from the ground (assuming an upright orientation of the bicycle) may be readily adjusted. The stabilizing wheel assembly may be used either unilaterally of the rear bicycle wheel as a third wheel or may be duplicated to thus obtain a stabilizing effect on both the left and the right side of the bicycle.

SUMMARY OF THE INVENTION

It is an object of the invention to provide an improved bicycle stabilizing wheel assembly which significantly improves the stability of the securement of the assembly to the bicycle frame and provides for a new resilient support and height adjustment for the stabilizing wheel.

These objects and others to become apparent as the specification progresses, are accomplished by the invention, according to which, briefly stated, the stabilizing wheel assembly has a support frame construction releasably securable to a bicycle and a stabilizing wheel secured to the support frame construction. The latter includes a substantially planar main plate attachable to the bicycle seat stay and the chain stay; a support bar affixed at one of its ends to the main plate and extending generally perpendicularly therefrom; and a fork unit having fork blades straddling the stabilizing wheel and being held on the support bar for a swinging motion in a plane parallel to the main plate. There is further provided an abutting mechanism carried by the support bar and arranged in a path of the swinging motion of one of the fork blades. The abutting mechanism has a rigid abutment member arranged to abut one fork blade on one side, a resilient abutment member arranged to abut that fork blade on the other side and adjusing arrangements for displacing the rigid and resilient abutment members, respectively, to set a determined angular position of the fork unit whereby a desired height position of the stabilizing wheel is established.

DESCRIPTION OF THE PREFERRED EMBODIMENT

Figure 1:
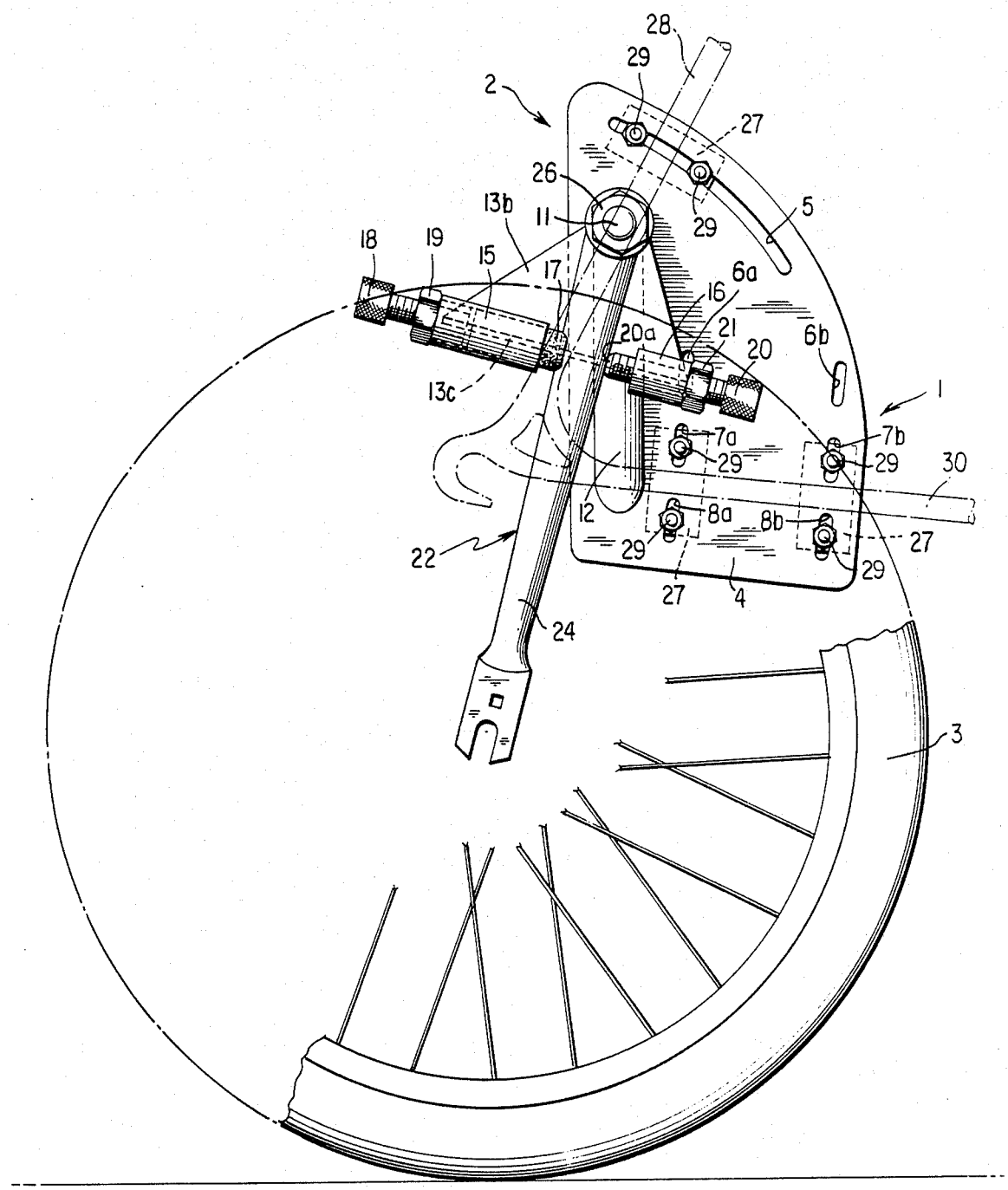
FIG. 1 is a side elevational view of a preferred embodiment of the invention.
Figure 2:
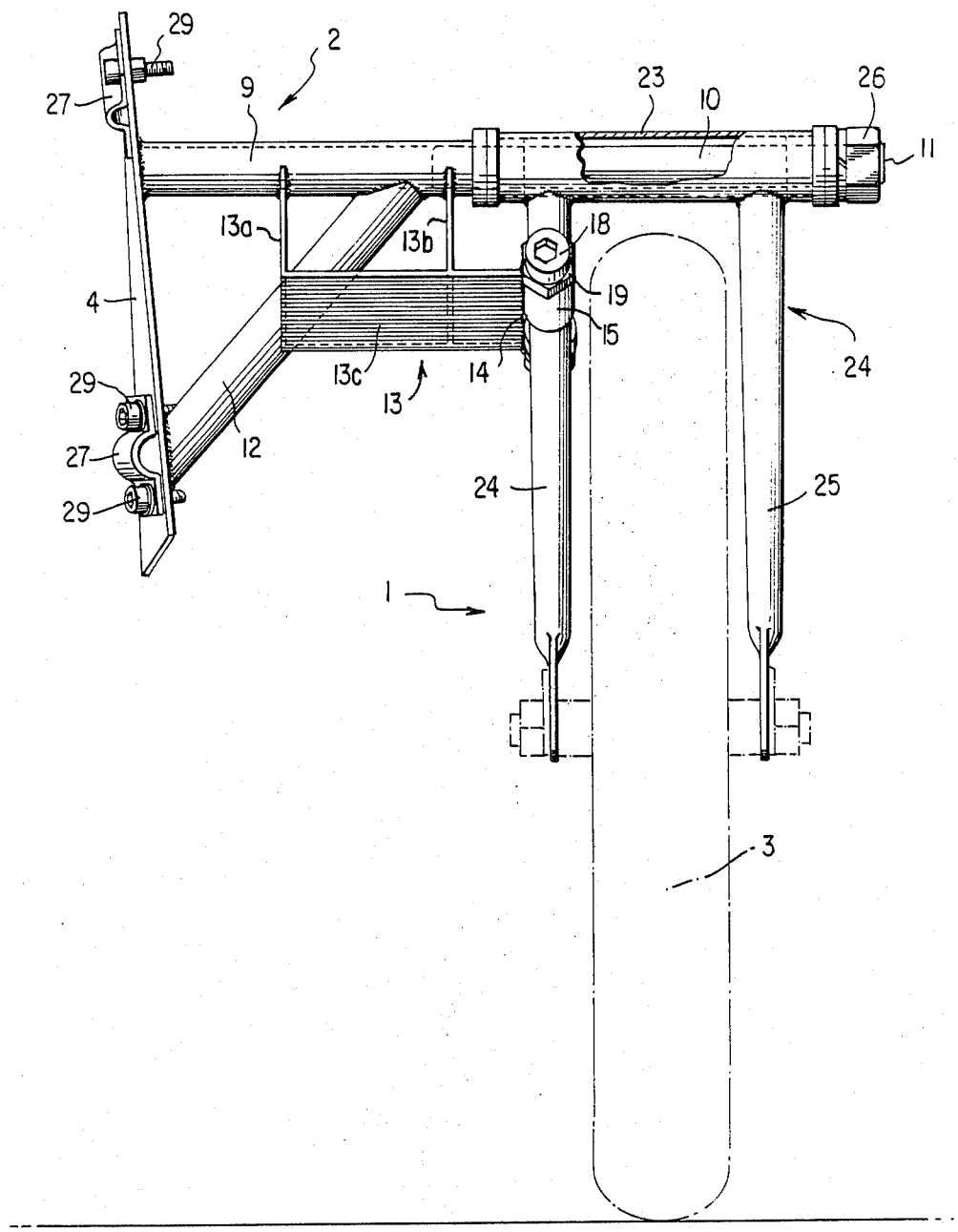
FIG. 2 is a rear elevational view of the structure shown in FIG. 1.

Turning now to FIGS. 1 and 2, there is shown a stabilizing wheel assembly generally designated at 1, illustrated in an orientation it assumes during normal bicycle travel. Directional terms such as "vertical", "horizontal", "top" or "bottom" used in the description refer to orientations during such normal bicycle travel.

The stabilizing wheel assembly 1 essentially consists of a support frame construction generally designated at 2 and a stabilizing wheel 3 mounted at the bottom of the support frame construction 2.

The support frame construction 2 comprises a main plate 4 having a vertically oriented plane extending parallel to the direction of bicycle travel. It has a relatively long arcuate slot 5 as well as several pairs (for example, three) of shorter slots 6a, 6b; 7a, 7b; and 8a, 8b.

To an upper part of the main plate 4 there is welded one end of a horizontal support bar 9 which continues in a pivot shaft 10 having a threaded terminus 11.

A reinforcing bar 12 is welded to a lower portion of the main plate 4 underneath the location of attachment of the support bar 9 and to the support bar 9 at a distance from the main plate 4. The reinforcing bar thus extends obliquely upwardly from the main plate 4, at an angle of approximately 45° thereto.

A support bracket 13 of generally U-shaped cross section is formed of triangular side walls 13a, 13b and a horizontally extending base plate 13c. The top of the side walls 13a and 13b is welded to the support bar 9. The reinforcing bar 12 traverses the base plate 13c and the side wall 13b in the region of their intersection and is welded thereto.

The base plate 13c projects beyond the side wall 13b and has an outer edge 14 to which there are welded two axially aligned and mutually spaced support sleeves 15 and 16. The support sleeve 15, at its end oriented towards the support sleeve 16 receives a cylindrical resilient shock absorber 17 which is countersupported and adjustable in its axial position by a setscrew 18 threadedly received in the support sleeve 15 at its end oriented away from the support sleeve 16. A lock nut 19 is threaded on the setscrew 18 and may be tightened against the radial face of the support sleeve 15 to thus immobilize the setscrew 18 in its desired position. An adjustable rigid abutment screw 20 is threadedly received in the support sleeve 16 and has a terminus 20a which is oriented towards the shock absorber 17 and projects from the support sleeve 16. A lock nut 21 is threaded on the abutment screw 20 and may be tightened against the radial face of the support sleeve 16 to thus immobilize the abutment screw 20 in its desired position.

The support frame construction 2 further comprises a fork unit generally designated at 22 formed of a horizontal pivot tube 23 and two downwardly extending, parallel-spaced fork blades 24 and 25 welded to the pivot tube 22. The pivot tube 23 is inserted on the pivot shaft 10 for pivotal motion about the horizontal axis of the pivot shaft 10. The fork blades 24, 25 straddle the stabilizing wheel 3 and are, at their lower end, attached to the axle of the stabilizing wheel 3. A securing nut 26 is threadedly received on the terminus 11 of the pivot shaft 10 for preventing outward axial displacement of the fork unit 22 on the pivot shaft 10.

The fork blade 24 extends between the support sleeves 15 and 16 and thus the extent of pivotal motion of the fork unit 21 about the axis of the pivot shaft 10 (that is, a pivotal motion in a vertical plane parallel to the direction of bicycle travel) is limited by the resilient shock absorber 17 and the abutment screw 20. The angular position of the fork unit 21 in its pivotal plane is adjustable by setting the abutment screw 20, while the resilient force of the shock absorber 17, urging the fork blades 24, 25 as a unit in a forward direction against the end 20a of the abutment screw 20 is adjustable by the setscrew 18.

The stabilizing wheel assembly 1 is secured to the bicycle by means of clamps 27 tightened to the main plate 4. More particularly, one of the clamps 27 straddles the seat stay 28 and is tightened thereto and the main plate 4 by securing assemblies 29 passing through the arcuate slot 5 of the main plate 4. Further, two clamps 27 straddle the chain stay 30 of the bicycle in a spaced relationship to one another and are tightened to the chain stay 30 and the main plate 4 by securing screw assemblies 29 passing through respective straight slots 6a, 6b of a selected slot pair.

The stabilizing wheel assembly 1 described above may be used as a single unit on one side of the rear wheel of the bicycle or two of the stabilizing wheel assemblies may be used for a bilateral ride stabilization.

The stabilizing wheel assembly, by virtue of its above-described construction, provides an improved combined stability over conventional stabilizing wheel assemblies.

Thus, the securement of the main plate 4 of the stabilizing wheel assembly 1 simultaneously to both the seat stay 28 and the chain stay 30 of the bicycle ensures that by virtue of the non-coinciding two-line contacts there is defined a definite clamping plane in which the stabilizing wheel assembly 1 is rigidly immobilized on the bicycle frame. Such rigidity is enhanced by the fact that the contact between the main plate 4 and the seat stay 28 as well as between the main plate 4 and the chain stay 30 is of significant length, amounting to about 4 to 6 inches each.

Due to its relatively large surface, the main plate 4 may contain a significant number of slots, providing for applicability of the assembly to bicycles of widely varying dimensions and further providing for a multi-position height adjustment of the entire assembly.

The resilient and adjustable pivot support for the fork unit 22 provided by the resilient shock absorber 17 and the abutment screw 20 makes possible a stepless height adjustment of the stabilizing wheel 3 from the ground. The resilient support for the fork unit 22 makes possible a springing motion of the fork unit in a vertical plane parallel to the travelling direction of the bicycle. Apart from taking up and absorbing road-surface roughness, the stabilizing wheel, by virtue of its vertical resiliency makes possible a reduction of the turning radius for the bicycle.

The fork unit 22 is supported on its pivot shaft 10 at a significant distance above the axle of the rear bicycle wheel thus lending increased stabilization of equilibrium in riding the bicycle.

The provision of two fork blades straddling the stabilizing wheel provides for an increased stability of the stabilizing wheel itself, compared with conventional constructions utilizing a single arm or fork.

It will be understood that the above description of the present invention is susceptible to various modifications, changes and adaptations, and the same are intended to be comprehended within the meaning and range of equivalents of the appended claims.

What is claimed is:

1. In a stabilizing wheel assembly for a bicycle having a seat stay and a chain stay; said assembly including a support frame construction releasably securable to the bicycle and a stabilizing wheel secured to said support frame construction; the improvement wherein said support frame construction includes
    (a) a substantially planar main plate;
    (b) attaching means for releasably securing said main plate to said seat stay and said chain stay such that in an installed state said main plate is in a continuous contcct with the seat stay and the chain stay along length portions thereof;
    (c) a support bar affixed at one end to said main plate and extending generally perpendicularly therefrom;
    (d) a fork unit formed of a pivot tube and two parallel-spaced fork blades affixed to said pivot tube and extending perpendicularly therefrom; said stabilizing wheel being secured to said fork blades and being straddled thereby; said pivot tube being held on said support bar for a swinging motion of said fork unit in a plane parallel to said main plate; and
    (e) an abutting mechanism carried by said support bar and arranged in a path of the swinging motion of one of said fork blades for limiting said swinging motion of the fork unit to a determined extent; said abutting mechanism including
        (1) a rigid abutment member arranged to abut said one fork blade on one side for rigidly limiting said swinging motion in one direction;
        (2) a resilient abutment member arranged to abut said one fork blade on another side for resiliently limiting said swinging motion in the other, opposite direction; and
        (3) first and second adjusting means for displacing said rigid and resilient abutment members, respectively, to set a determined angular position of said fork unit whereby a desired height position of said stabilizing wheel is established.

2. A stabilizing wheel assembly as defined in claim 1, further comprising a support bracket affixed to said support bar; said abutting mechanism having a first and a second support sleeve affixed to said support bracket and being situated on opposite sides of said one fork blade; said rigid abutment member and said first adjusting means being held in said first support sleeve; said resilient abutment member and said second adjusting means being held in said second support sleeve.

3. A stabilizing wheel assembly as defined in claim 1, wherein said main plate is planar and is, in the installed state, oriented vertically in a normal upright position of the bicycle and is parallel to a straight travelling direction thereof.

4. A stabilizing wheel assembly as defined in claim 2, further comprising a reinforcing bar having one end affixed to said main plate and another end affixed to said support bar; said reinforcing bar being oriented at an oblique angle to said support bar and traversing said support bracket; said reinforcing bar being affixed to said support bracket at a location between the ends of said reinforcing bar.

* * * * *